United States Patent
Tyan et al.

(10) Patent No.: US 7,662,449 B2
(45) Date of Patent: Feb. 16, 2010

(54) LIQUID CRYSTAL DISPLAY

(75) Inventors: Horng-Long Tyan, Hsinchu (TW); Chyi-Ming Leu, Taichung County (TW); Hang-Chang Chang, Hsinchu (TW); Tzong-Ming Lee, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 190 days.

(21) Appl. No.: 11/394,105

(22) Filed: Mar. 31, 2006

(65) Prior Publication Data

US 2007/0116899 A1 May 24, 2007

Related U.S. Application Data

(63) Continuation-in-part of application No. 11/283,872, filed on Nov. 22, 2005.

(51) Int. Cl.
 *B32B 27/28* (2006.01)
(52) U.S. Cl. .......................... 428/1.6; 349/158
(58) Field of Classification Search ............ 428/1.3, 428/1.6, 1.31; 349/158, 106
See application file for complete search history.

(56) References Cited

U.S. PATENT DOCUMENTS

| | | | | |
|---|---|---|---|---|
| 3,287,311 A * | 11/1966 | Edwards | ...... | 524/600 |
| 4,751,146 A * | 6/1988 | Maeda et al. | ...... | 428/475.8 |
| 5,364,908 A * | 11/1994 | Oishi et al. | ...... | 525/64 |
| 5,610,742 A * | 3/1997 | Hinata et al. | ...... | 349/122 |
| 5,856,065 A * | 1/1999 | Hagen | ...... | 430/283.1 |
| 5,856,432 A * | 1/1999 | Auman et al. | ...... | 528/353 |
| 6,010,825 A * | 1/2000 | Hagen et al. | ...... | 430/283.1 |
| 6,214,923 B1 * | 4/2001 | Goto et al. | ...... | 524/514 |
| 6,525,791 B1 * | 2/2003 | Tsuda et al. | ...... | 349/106 |
| 6,710,160 B2 * | 3/2004 | Yamashita et al. | ...... | 528/353 |
| 6,734,276 B2 * | 5/2004 | Yamashita et al. | ...... | 528/170 |
| 6,962,756 B2 * | 11/2005 | Kihara et al. | ...... | 428/690 |
| 7,026,032 B2 * | 4/2006 | Lee et al. | ...... | 428/98 |
| 7,160,587 B2 * | 1/2007 | Doi | ...... | 428/1.6 |
| 2002/0022710 A1 * | 2/2002 | McGrath et al. | ...... | 528/170 |
| 2002/0192445 A1 * | 12/2002 | Ezzell et al. | ...... | 428/212 |
| 2003/0078333 A1 * | 4/2003 | Kawaguchi et al. | ...... | 524/447 |
| 2003/0104232 A1 | 6/2003 | Kihara et al. | | |
| 2003/0134460 A1 * | 7/2003 | Forbes et al. | ...... | 438/158 |
| 2005/0145832 A1 * | 7/2005 | Wessling et al. | ...... | 252/500 |

* cited by examiner

*Primary Examiner*—David R Sample
*Assistant Examiner*—Sophie Hon
(74) *Attorney, Agent, or Firm*—Birch, Stewart, Kolasch & Birch, LLP

(57) ABSTRACT

A liquid crystal display. The liquid crystal display includes a color filter substrate and an array substrate, wherein at least one of the color filter substrate and the array substrate comprises polyimide having formula (I):

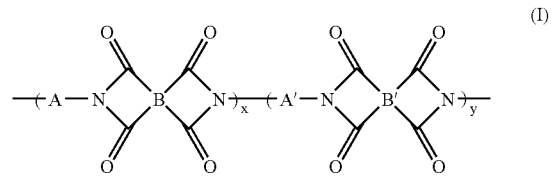

wherein A and A' are the same or different and comprise cycloaliphatic compounds or aromatic compounds, B and B' are the same or different and comprise cycloaliphatic compounds or aromatic compounds, and x and y are 10~10000, wherein at least one of A and A' is a cycloaliphatic compound.

28 Claims, 1 Drawing Sheet

LIQUID CRYSTAL DISPLAY

This application is a Continuation-In-Part of copending application Ser. No. 11/283,872 filed on Nov. 22, 2005, the entire contents of which are hereby incorporated by reference and for which priority is claimed under 35 U.S.C. § 120.

BACKGROUND

The invention relates to a liquid crystal display, and more specifically to a polyimide liquid crystal display.

With advances in information and digitization, light, thin, and portable electronic products utilizing thin display panels have become popular. However, they are inconvenient for transport and complicated fabrication may cause low yield.

Thus, a transparent and flexible plastic substrate (0.1~0.2 mm) has been developed. Such plastic substrate is thin, light, durable, and portable, and produced by a continuous rolling process, significantly reducing costs Unfortunately, problems such as deposition of indium tin oxide (ITO) and thin film transistor (TFT) thereon and back-end panel assembly occur. Additionally, the glass transition temperature (Tg) of the optical-level plastic substrate such as PET, PEN, PC, or m-COC (Arton or Zeonor) is lower than 200° C., unfavorable for fabrication. Also, PES substrate has insufficient solvent resistance, with yellowing and cracking at high temperatures (200° C.). Furthermore, some polyimide plastic substrates capable of thermal and solvent resistance, being dark brown, are only suitable for use in reflective LCD panels, not transmissive LCD panels.

Conventional extended polyimide has a lower coefficient of-thermal expansion (CTE) of about 20 ppm/° C., its retardation, however, is too large (Rth>1000 nm) for use in LCD panels.

Additionally, the plastic substrate must be fixed to a glass substrate by resin glue to facilitate subsequent multi-lithography and etching due to difficulty in handling. However, TFT element breakage and residual resin glue may easily occur when the plastic substrate is taken off the glass substrate.

SUMMARY

The invention provides a liquid crystal display comprising a color filter substrate and an array substrate, wherein at least one of the color filter substrate and the array substrate comprises polyimide having formula (I):

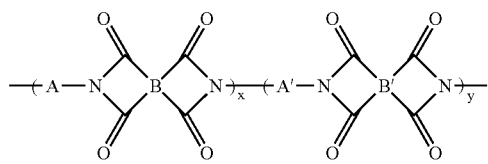

wherein A and A' are the same or different and comprise cycloaliphatic compounds or aromatic compounds, B and B' are the same or different and comprise ycloaliphatic compounds or aromatic compounds, and x and y are 10~10000, wherein at least one of A and A' is a cycloaliphatic compound.

A detailed description is given in the following embodiments with reference to the accompanying drawing.

BRIEF DESCRIPTION OF THE DRAWINGS

The invention can be more fully understood by reading the subsequent detailed description and examples with references made to the accompanying drawing, wherein.

DETAILED DESCRIPTION

Figure 1:
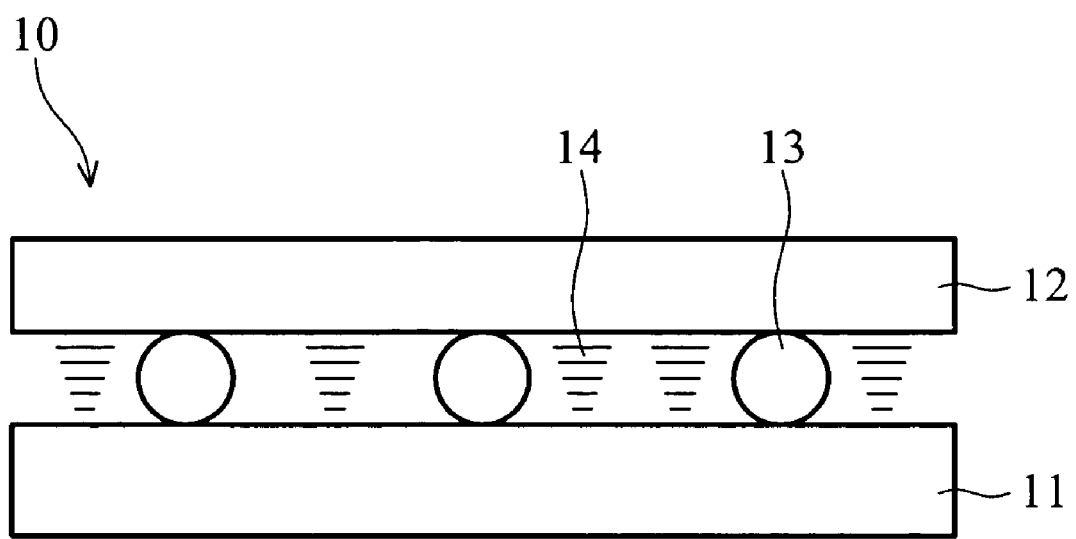
FIG. 1 is a cross section of a liquid crystal display of the invention.

The invention provides a liquid crystal display comprising a color filter substrate and an array substrate. At least one of the color filter substrate and the array substrate comprises polyimide having formula (I):

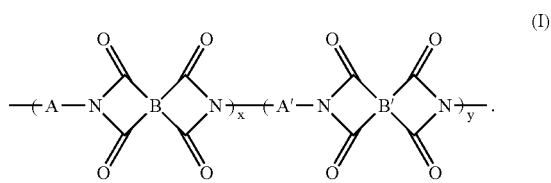

The polyimide may be further mixed with inorganic powder such as silicate, silicon oxide or titanium oxide. The inorganic powder has a diameter of about 10~400 nm, preferably 10~100 nm. In the mixture, the inorganic powder has a weight ratio of about 1~20 wt %, preferably 2~10 wt %.

The polyimide material mixed with inorganic nano powder formed by the organic/inorganic nano hybrid technique of the invention provides size stability, high heat resistance, high chemical resistance, and high pencil hardness. Also, the inorganic powder can reduce retardation of PI substrate, achieving optical compensation of-LCD panel.

In formula (I), A and A' may be the same or different and comprise cycloaliphatic compounds such as

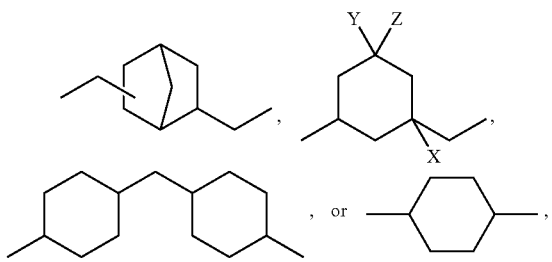

wherein X, Y, and Z may comprise hydrogen, methyl, trifluoromethyl, hydroxyl, $C_{1-18}$ alkyl, bromine, chlorine, or iodine, or aromatic compounds such as

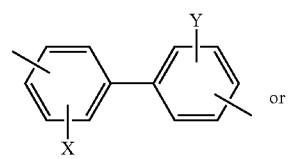

-continued

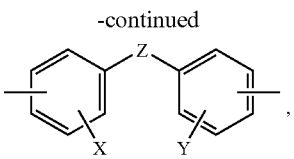

wherein X and Y may comprise hydrogen, methyl, trifluoromethyl, hydroxyl, $C_{1-18}$ alkyl, bromine, chlorine, or iodine and Z may comprise —O—, —CH$_2$—, —S—, —SO$_2$—, —C(CH$_3$)$_2$—, —Ar—O—Ar—, —Ar—CH$_2$—Ar—, —O—Ar—C(CH$_3$)$_2$—Ar—O—, —O—Ar—Ar—O—, —O—Ar—C(CF$_3$)$_2$—Ar—O—, or —Ar—C(CH$_3$)$_2$—Ar—, wherein Ar is phenyl.

B and B' may be the same or different and comprise cycloaliphatic compounds such as

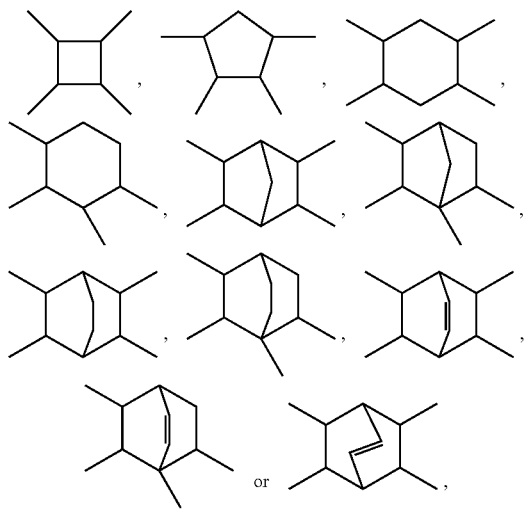

or aromatic compounds such as

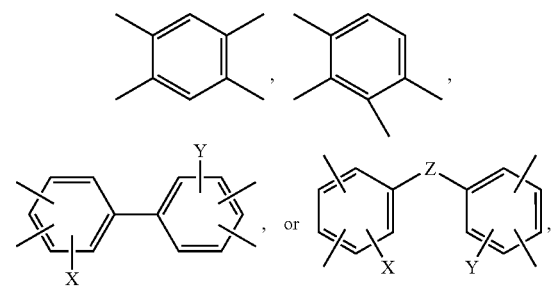

wherein X and Y may comprise hydrogen, methyl, trifluoromethyl, hydroxyl, $C_{1-18}$ alkoxy, bromine, chlorine, or iodine and Z may comprise —O—, —SO$_2$—, —CH$_2$—, —C(CH$_3$)$_2$—, —COO(CH$_3$)$_2$COO—, —C(CF$_3$)$_2$—, —Ar—O—Ar—, —O—Ar—O—, —Ar—CH$_2$—Ar—, —O—Ar—C(CH$_3$)$_2$—Ar—O—, —O—Ar—Ar—O—, —O—Ar—C(CF$_3$)$_2$—Ar—O—, or —Ar—C(CH$_3$)$_2$—Ar—, wherein Ar is phenyl. B and B' may be

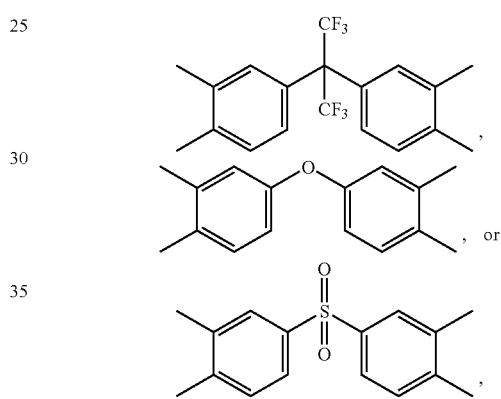

and x and y may be 10~10000.

The polyimide having formula (I) provided by the invention comprises

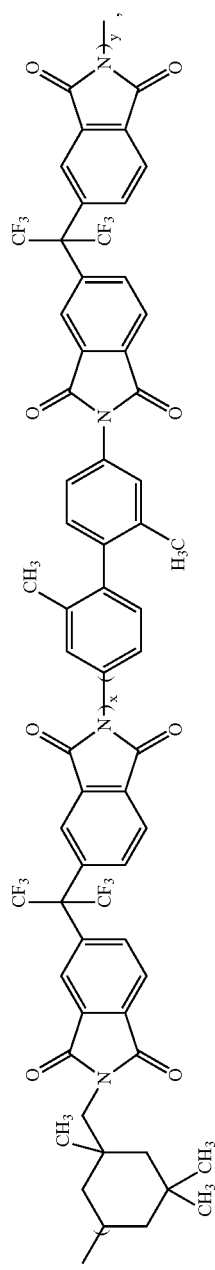
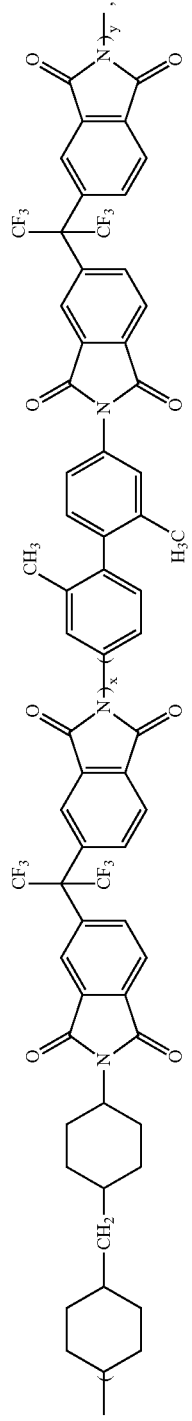
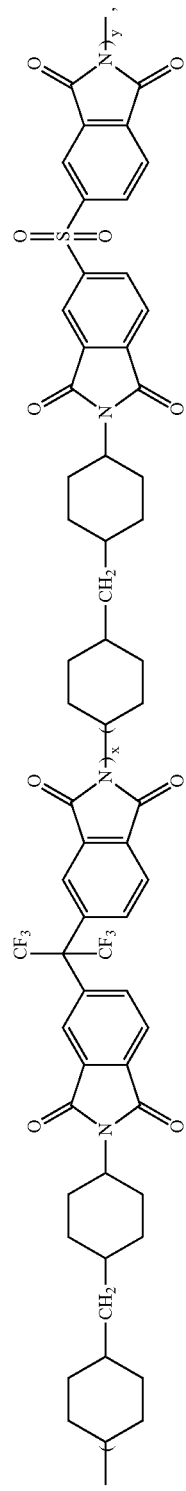
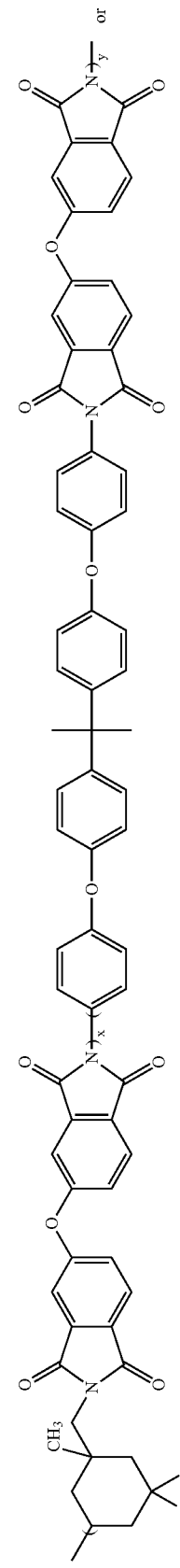
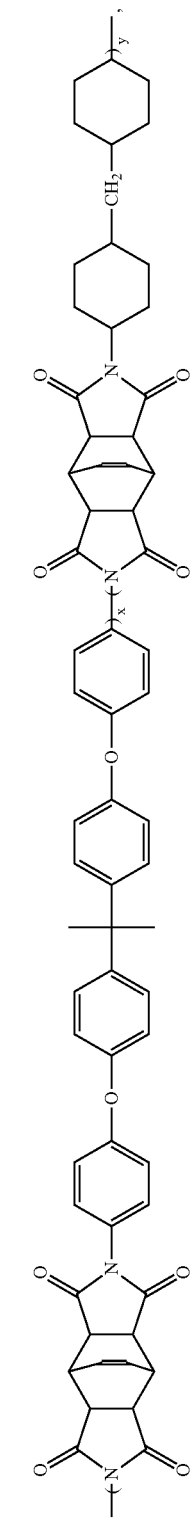

wherein x and y may be 10~10000.

The polyimide provided by the invention may have formula (II):

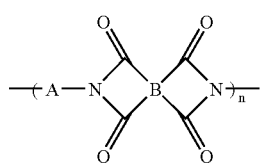

(II)

In formula (II), A may be a cycloaliphatic compound such as

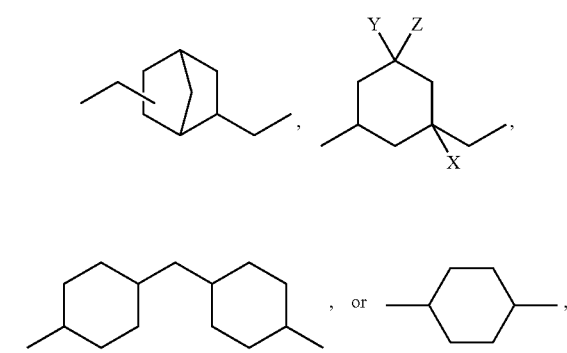

wherein X, Y, and Z may comprise hydrogen, methyl, trifluoromethyl, hydroxyl, C1-18 alkyl, bromine, chlorine, or iodine.

B may be an aromatic compound such as

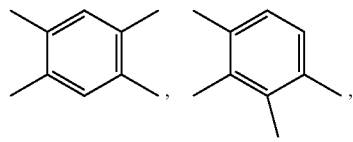

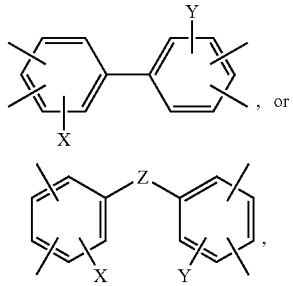

wherein X and Y may comprise hydrogen, methyl, trifluoromethyl, hydroxyl, $C_{1-18}$ alkoxy, bromine, chlorine, or iodine and Z may comprise —O—, —SO$_2$—, —CH$_2$—, —C(CH$_3$)$_2$—, —COO(CH$_3$)$_2$COO—, —C(CF$_3$)$_2$—, —Ar—O—Ar—, —O—Ar—O—, —Ar—CH$_2$—Ar—, —O—Ar—C(CH$_3$)$_2$—Ar—O—, —O—Ar—Ar—O—, —O—Ar—C(CF$_3$)$_2$—Ar—O—, or —Ar—C(CH$_3$)$_2$—Ar—, wherein Ar is phenyl. B and B' may be

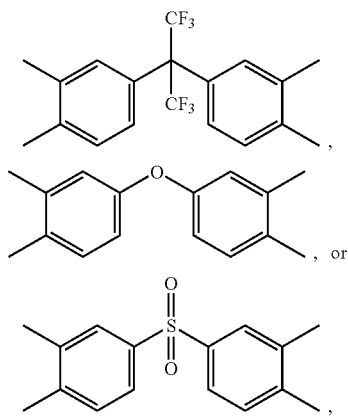

and n may be 10~10000.

The polyimide having formula (II) provided by the invention comprises

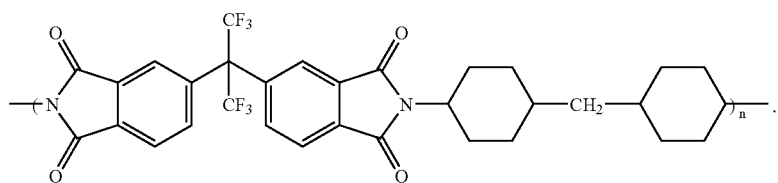

The compound of formula (II) is prepared in two steps as follows. First, a diamine such as 4,4-methylene bis(cyclohexylamine) (DACH), a dianhydride monomer such as 2,2'-bis(3,4-dicarboxyphenyl) hexafluoropropane dianhydride (6FDA), and a polar solvent such as N-methyl-2-pyrrolidone (NMP) or N,N-dimethylacetamide (DMAc) are added to a flask and reacted to form a poly(amic acid) (PAA). The PAA is then imidized at about 300~400° C. to form a polyimide via dehydration and cyclization. The reaction scheme is shown below.

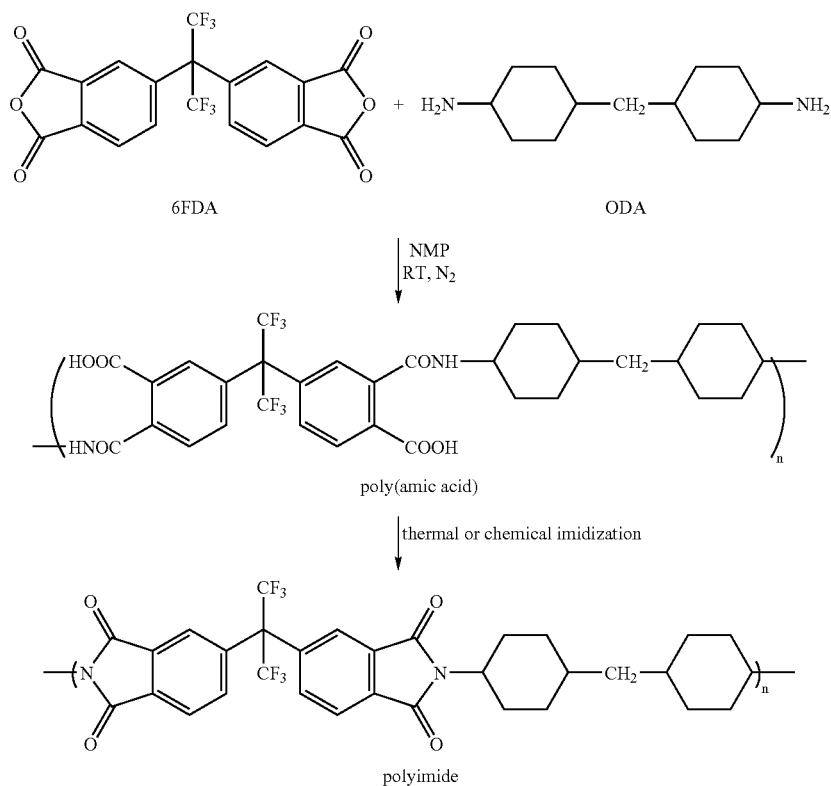

Second, a diamine such as 4,4-methylene bis(cyclohexylamine) (DACH), a dianhydride monomer such as 2,2'-bis(3,4-dicarboxyphenyl) hexafluoropropane dianhydride (6FDA), and a solvent such as m-cresol or phenol are added to a flask and reacted at a reflux temperature to form a polyimide via PAA formation, dehydration, and cyclization. The reaction scheme is shown below.

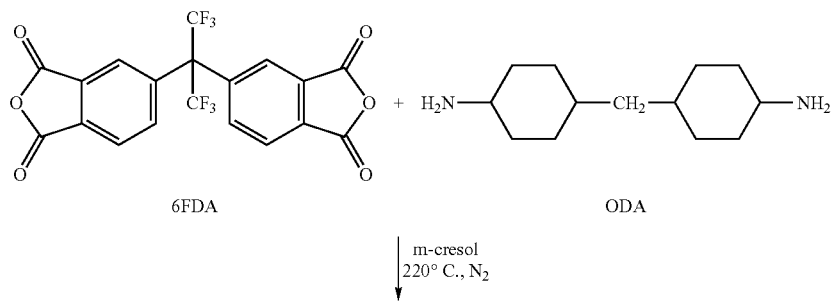

-continued

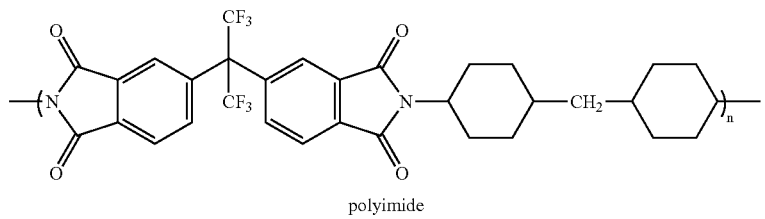
polyimide

Compared to the traditional polyimide, the disclosed polyimide, a partial phenyl structure, comprising a cycloaliphatic diamine monomer and an aromatic dianhydride monomer, provides higher thermal resistance and transmission rate and improved workability and chemical resistance due to conduction of the cycloaliphatic compounds thereto.

The polyimide film has haze less than 3%, a transmission rate exceeding 70%, a yellow index less than 6.5, a glass transition temperature of about 250~350° C., a coefficient of thermal expansion of about 20~75 ppm/° C., a pencil hardness exceeding 2H, retardation less than 200 nm and a thickness of about 20~200 μm, preferably 50~150 μm.

In FIG. 1, a liquid crystal display structure of the invention is illustrated. A liquid crystal display 10 comprises an array substrate 11, a color filter substrate 12, spacers 13, and liquid crystals 14. At least one of the array substrate 11 and color filter substrate 12 is composed of polyimide. The array substrate 11 is opposite to the color filter substrate 12 and the spacers 13 and liquid crystals 14 are formed the therebetween.

EXAMPLES

Example 1

Preparation of 6FDA-DACH (PI-FD)

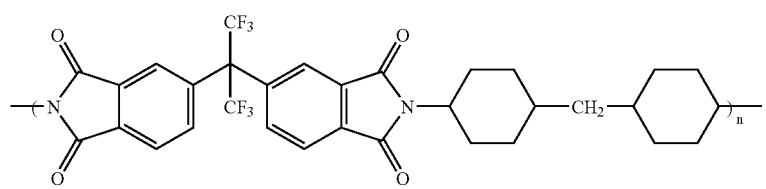

2.32 g DACH was dissolved in 41 g DMAc at room temperature under nitrogen gas. Next, 5 g 6 FDA was added to form a sticky PAA solution with stirring for 3 hr. The PAA solution was then filmed on a glass substrate by a doctor blade and imidized at 100° C., 200° C., and 300° C., respectively, for 1 hr to form a transparent and colorless polyimide film.

Example 2

Preparation of 6FDA-m-TB-HG-co-6FDA-IPDA (PI-FTI)

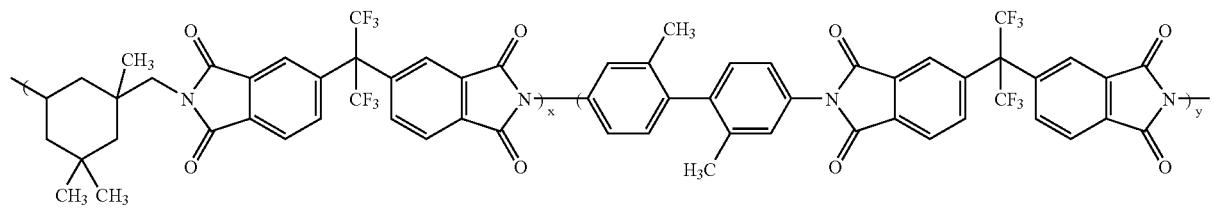

1.64 g m-TB-HG and 0.56 g IPDA were dissolved in 41 g DMAc at room temperature under nitrogen gas. Next, 5 g 6FDA was added to form a sticky PAA solution with stirring for 3 hr. The PAA solution was then filmed on a glass substrate by a doctor blade and imidized at 100° C., 200° C., and 300° C., respectively, for 1 hr to form a transparent and colorless polyimide film.

Example 3

Preparation of 6FDA-m-TB-HG-co-6FDA-DACH (PI-FTD)

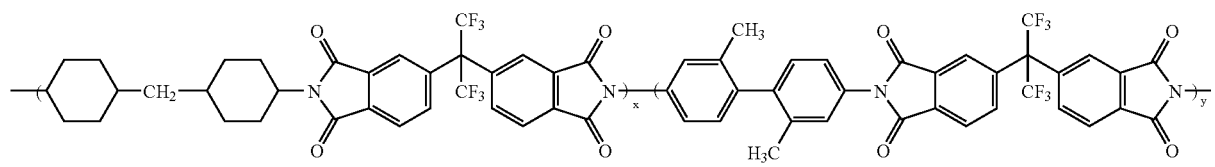

1.63 g M-TB-HG and 0.70 g DACH were dissolved in 42 g DMAC at room temperature under nitrogen gas. Next, 5 g 6FDA was added to form a sticky PAA solution with stirring for 3 hr. The PAA solution was then filmed on a glass substrate by a doctor blade and imidized at 100° C., 200° C., and 300° C., respectively, for 1 hr to form a transparent and colorless polyimide film.

Example 4

Preparation of 6FDA-m-DACH-co-DSDA-DACH (PI-FDD)

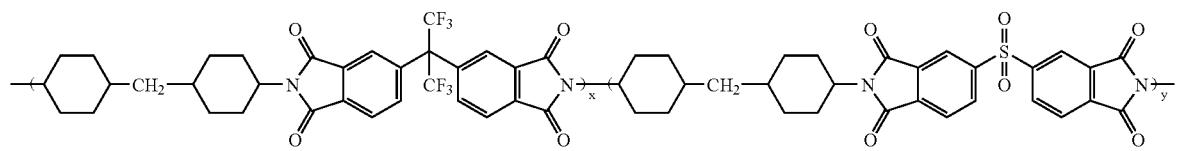

3.12 g DACH was dissolved in 46 g DMAc at room temperature under nitrogen gas. Next, 3 g 6FDA and 3 g DSDA were added to form a sticky PAA solution with stirring for 3 hr. The PAA solution was then filmed on a glass substrate by a doctor blade and imidized at 100° C., 200° C., and 300° C., respectively, for 1 hr to form a transparent and colorless polyimide film.

Example 5

Preparation of ODPA-BAPPm-co-ODPA-IPDA (PI-OBI)

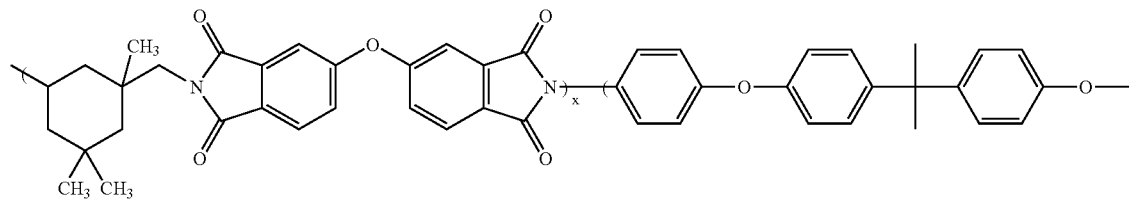

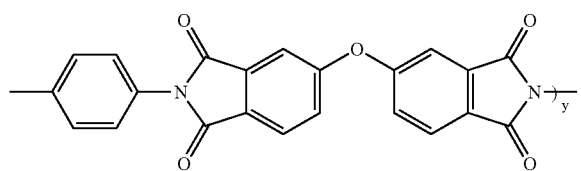

4.53 g BAPPm and 0.81 g IPDA were dissolved in 59 g DMAc at room temperature under nitrogen gas. Next, 5 g ODPA was added to form a sticky PAA solution with stirring for 3 hr. The PAA solution was then filmed on a glass substrate by a doctor blade and imidized at 100° C., 200° C., and 300° C., respectively, for 1 hr to form a transparent and colorless polyimide film.

Example 6

Preparation of B1317-BAPPm-co-B1317-DACH (PI-BD)

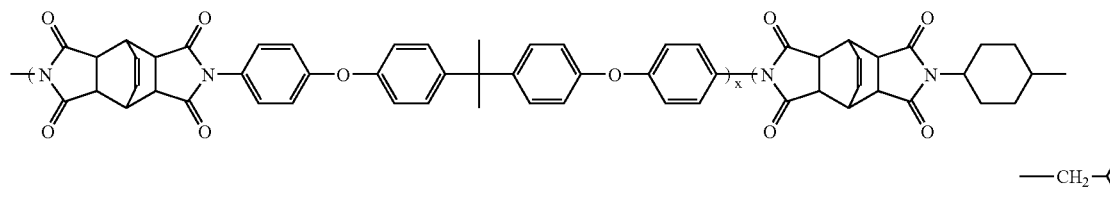

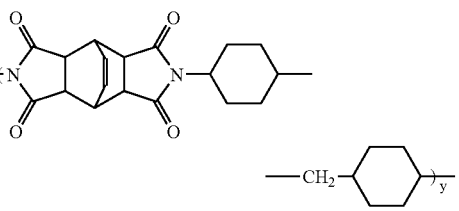

16.2 g BAPPm and 8.3 g DACH were dissolved in 250 g DMAc at room temperature under nitrogen gas. Next, 20 g B1317 was added to form a sticky PAA solution with stirring for 3 hr. The PAA solution was then filmed on a glass substrate by a doctor blade and imidized at 100° C., 200° C., and 300° C., respectively, for 1 hr to form a transparent and colorless polyimide film.

Example 7

Preparation of PI-BD/Silicate Composition 50 g silicate was added to 900 g DMAc at 60° C. with high-speed pulverizing and dispersing to form a clarifying solution containing 80~150 nm powders. Next, 1 wt % silicate clarifying solution was added to the PI-BD PAA solution at 25° C. with stirring for 4 hr to form a sticky PI-BD PAA/silicate solution. The resulting solution was then filmed on a glass substrate by a doctor blade and imidized at 100° C., 200° C., and 300° C., respectively, for 1 hr to form a transparent and colorless PI-BD/silicate composition (weight ratio=99:1).

Example 8

Preparation of PI-BD/Silicate Composition 50 g silicate was added to 900 g DMAc at 60° C. with high-speed pulverizing and dispersing to form a clarifying solution containing 80~150 nm powders. Next, 3 wt % silicate clarifying solution was added to the PI-BD PAA solution at 25° C. with stirring for 4 hr to form a sticky PI-BD PAA/silicate solution. The resulting solution was then filmed on a glass substrate by a doctor blade and imidized at 100° C., 200° C., and 300° C., respectively, for 1 hr to form a transparent and colorless PI-BD/silicate composition (weight ratio=97:3).

Example 9

Preparation of PI-BD/Silicate Composition 50 g silicate was added to 900 g DMAc at 60° C. with high-speed pulverizing and dispersing to form a clarifying solution containing 80~150 nm powders. Next, 5 wt % silicate clarifying solution was added to the PI-BD PAA solution at 25° C. with stirring for 4 hr to form a sticky PI-BD PAA/silicate solution. The resulting solution was then filmed on a glass substrate by a doctor blade and imidized at 100° C., 200°

C., and 300° C., respectively, for 1 hr to form a transparent and colorless PI-BD/silicate composition (weight ratio=95: 5).

Example 10

Preparation of PI-BD/Silicate Composition 50 g silicate was added to 900 g DMAC at 60° C. with high-speed pulverizing and dispersing to form a clarifying solution containing 80~150 nm powders. Next, 10 wt % silicate clarifying solution was added to the PI-BD PAA solution at 25° C. with stirring for 4 hr to form a sticky PI-BD PAA/ silicate solution. The resulting solution was then filmed on a glass substrate by a doctor blade and imidized at 100° C., 200° C., and 300° C., respectively, for 1 hr to form a transparent and colorless PI-BD/silicate composition (weight ratio=90: 10).

Example 11

Preparation of PI-BD/Silicate Composition 50 g silicate was added to 900 g DMAc at 60° C. with high-speed pulverizing and dispersing to form a clarifying solution containing 80~150 nm powders. Next, 20 wt % silicate clarifying solution was added to the PI-BD PAA solution at 25° C. with stirring for 4 hr to form a sticky PI-BD PAA/ silicate solution. The resulting solution was then filmed on a glass substrate by a doctor blade and imidized at 100° C., 200° C., and 300° C., respectively, for 1 hr to form a transparent and colorless PI-BD/silicate composition (weight ratio=80: 20).

Thickness, haze, transmission rate, yellow index, glass transition temperature, and coefficient of thermal expansion of the disclosed polyimide film (such as PI-FD, PI-FTI, PI-FTD, PI-FDD, and PI-OBI) and conventional material (such as PES, Kapton, and Ube) are compared in Table 1.

mixed with inorganic silicate powder (weight ratio of 1 wt %, 3 wt %, 5 wt %, 10 wt % and 20 wt %, respectively) and conventional material (such as PES, Kapton, and Ube) are compared in Table 2.

TABLE 2

|  | Thickness (μm) | Haze (%) | Transmission rate (%) | Yellow index |
|---|---|---|---|---|
| Polyimide |  |  |  |  |
| PI-BD/1 wt % | 50 | 0.66 | 89.0 | 2.04 |
| PI-BD/3 wt % | 53 | 0.83 | 88.3 | 2.52 |
| PI-BD/5 wt % | 47 | 1.95 | 88.5 | 3.83 |
| PI-BD/10 wt % | 41 | 3.23 | 87.8 | 4.57 |
| PI-BD/20 wt % | 44 | 3.68 | 87.0 | 5.60 |
| Conventional material |  |  |  |  |
| PES | 200 | 0.30 | 89.0 | 0.97 |
| Kapton | 25 | 0.72 | 73.6 | 82.34 |
| Ube | 51 | 2.49 | 32.1 | 66.46 |

|  | Glass transition temperature (° C.) | Coefficient of thermal expansion (ppm/° C.) | Pencil hardness (H) | Retardation (nm) |
|---|---|---|---|---|
| Polyimide |  |  |  |  |
| PI-BD/1 wt % | 321 | 70 | 2H | 207 |
| PI-BD/3 wt % | 330 | 63 | 3H | 173 |
| PI-BD/5 wt % | 335 | 51 | 3H | 159 |
| PI-BD/10 wt % | 325 | 42 | 4H | 148 |
| PI-BD/20 wt % | 318 | 36 | 4H | 124 |
| Conventional material |  |  |  |  |
| PES | 225 | 58 | H | 25 |
| Kapton | 318 | 16 | H | 6923 |
| Ube | 332 | 23 | H | >9999 |

TABLE 1

|  | Thickness (μm) | Haze (%) | Transmission rate (%) | Yellow index | Glass transition temperature (° C.) | Coefficient of thermal expansion (ppm/° C.) |
|---|---|---|---|---|---|---|
| Polyimide |  |  |  |  |  |  |
| PI-FD | 59 | 0.24 | 90.3 | 6.33 | 326 | 68 |
| PI-FTI | 69 | 1.96 | 89.4 | 3.59 | 336 | 71 |
| PI-FTD | 79 | 1.74 | 90.0 | 3.98 | 307 | 75 |
| PI-FDD | 60 | 1.74 | 90.7 | 2.78 | 301 | 61 |
| PI-OBI | 52 | 2.91 | 89.0 | 6.37 | 285 | 73 |
| Conventional material |  |  |  |  |  |  |
| PES | 200 | 0.30 | 89.0 | 0.97 | 225 | 58 |
| Kapton | 25 | 0.72 | 73.6 | 82.34 | 318 | 16 |
| Ube | 51 | 2.49 | 32.1 | 66.46 | 332 | 23 |

Compared to the disclosed polyimide, the conventional PES is a poor substrate material because of its lower glass transition temperature even with optimal haze, transmission rate, and yellow index. Kapton and Ube are also unsuitable for use due to raised yellow index and deteriorated transmission rate.

Thickness, haze, transmission rate, yellow index, glass transition temperature, coefficient of thermal expansion, pencil hardness and retardation of the disclosed PI-BD PI films Additionally, the disclosed polyimide can be directly filmed on a glass substrate without use of resin glue and easily removed after multi-lithography and etching or treating with a water bath, simplifying the TFT processes. The polyimide can be widely used in flexible LCDs, PDPs, FEDs, SEDs, E-inks, and E-papers, or OLEDs.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal display, comprising: a color filter substrate; and an array substrate; wherein at least one of the color filter substrate and the array substrate consists of polyimide having formula (I) and inorganic powder, wherein the inorganic powder has a weight ratio of about 1-20 wt %,

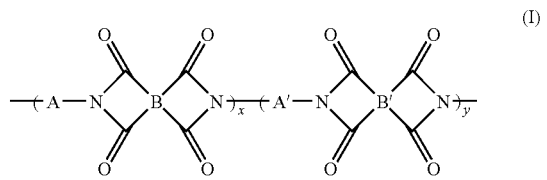
(I)

wherein A and A' are the same or different and comprise (a) cycloaliphatic compounds comprising at least one of

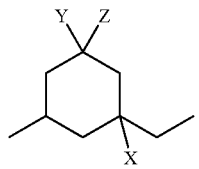

and

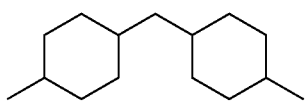

wherein X, Y, Z comprise hydrogen, methyl, trifluoromethyl, hydroxyl, $C_{1-18}$ alkyl, bromine, chlorine or iodine or (b) aromatic compounds, B and B' are the same or different and comprise aromatic compounds and optionally cycloaliphatic compounds, and x and y are 10~10,000, and wherein at least one of A and A' is a cycloaliphatic compound from the a cycloaliphatic compounds comprising at least one of

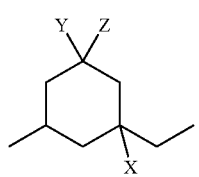

and

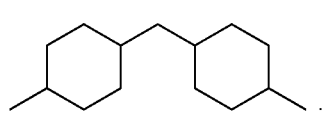

2. The liquid crystal display as claimed in claim 1 wherein the inorganic powder comprises silicate, silicon oxide or titanium oxide.

3. The liquid crystal display as claimed in claim 1, wherein the inorganic powder has a diameter of about 10 ~400 nm.

4. The liquid crystal display as claimed in claim 1, wherein the inorganic powder has a diameter of about 10 ~100 nm.

5. The liquid crystal display as claimed in claim 1, wherein the inorganic powder has a weight ratio of about 2 ~10 wt %.

6. The liquid crystal display as claimed in claim 1, wherein one of A and A' comprises

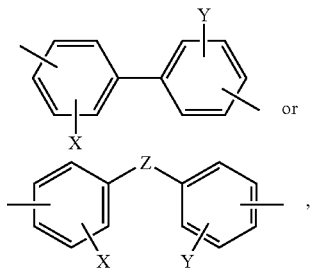

wherein X and Y comprise hydrogen, methyl, trifluoromethyl, hydroxyl, $C_{1-18}$ alkyl, bromine, chlorine, or iodine and Z comprises —O—, —CH$_2$—, —S—, —SO$_2$—, —C(CH$_3$)$_2$—, —Ar—O—Ar—, —Ar—CH$_2$—Ar—, —O—Ar—C(CH$_3$)$_2$—Ar—O —, —O—Ar—Ar—O—, —O—Ar—C(CF$_3$)$_2$—Ar—O—, or —Ar—C(CH$_3$)$_2$—Ar—, wherein Ar is phenyl.

7. The liquid crystal display as claimed in claim 1, wherein the optional cycloaliphatic compounds of B and B' comprise

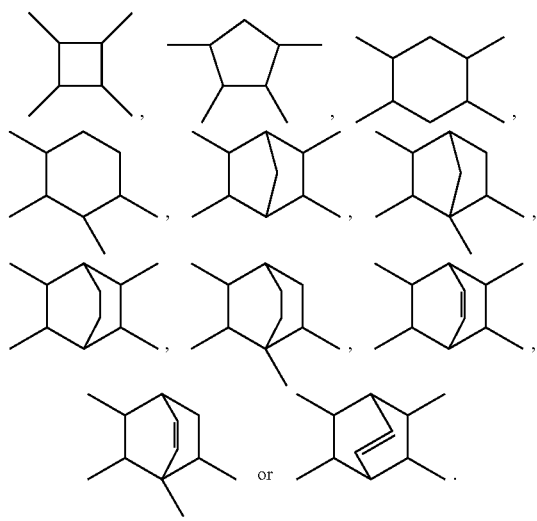

8. The liquid crystal display as claimed in claim 1, wherein B and B' comprise

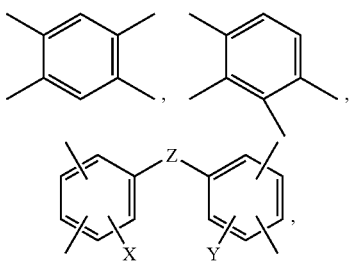

wherein X and Y comprise hydrogen, methyl, trifluoromethyl, hydroxyl, $C_{1-18}$ alkoxy, bromine, chlorine, or iodine and Z comprises —O—, —SO₂—, —CH₂—, —C(CH₃)₂—, —COO(CH₃)₂COO—, —C(CF₃)₂—, —Ar—O—Ar—, —O—Ar—O—, —Ar—CH₂—Ar—, —O—Ar—C(CH₃)₂—Ar—O—, —O—Ar—Ar—O—, —O—Ar—C(CF₃)₂—Ar—O—, or —Ar—C(CH₃)₂—Ar—, wherein Ar is phenyl.

9. The liquid crystal display as claimed in claim 1, wherein B and B' comprise

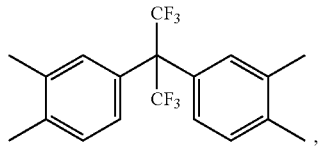

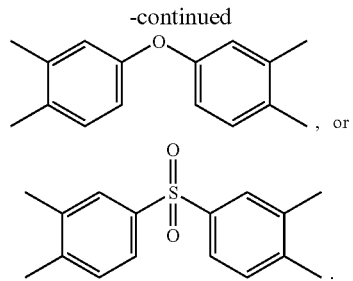

10. The liquid crystal display as claimed in claim 1, wherein the polyimide comprises

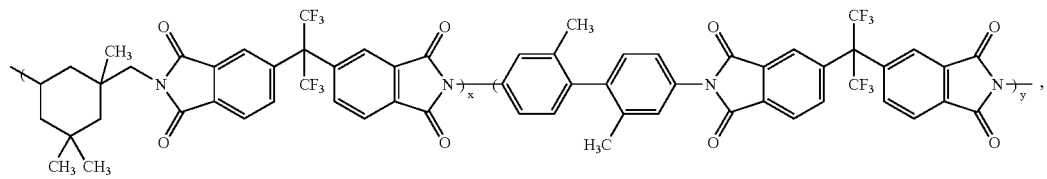

wherein x and y are 10~10000.

11. The liquid crystal display as claimed in claim 1, wherein the polyimide comprises

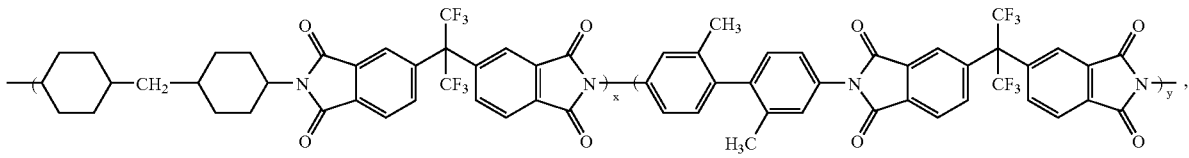

wherein x and y are 10~10000.

12. The liquid crystal display as claimed in claim 1, wherein the polyimide comprises

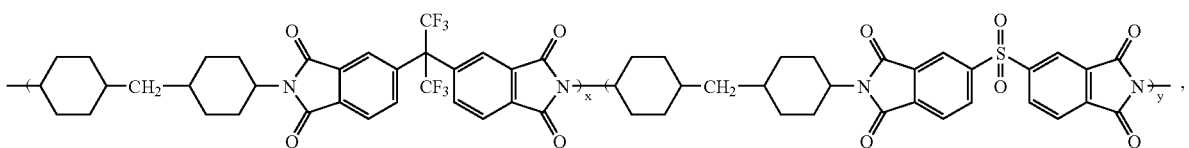

wherein x and y are 10~10000.

13. The liquid crystal display as claimed in claim 1, wherein the polyimide comprises

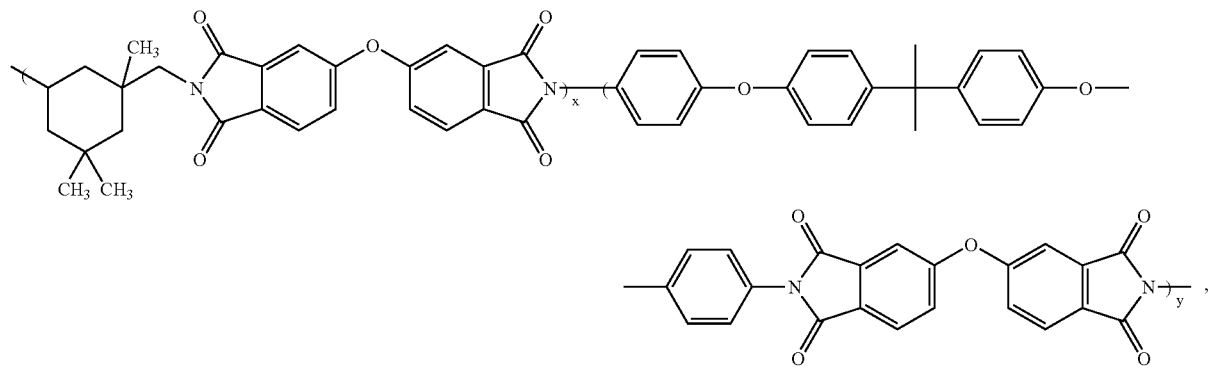

wherein x and y are 10~10000.

14. The liquid crystal display as claimed in claim 1, wherein the polyimide comprises formula (II):

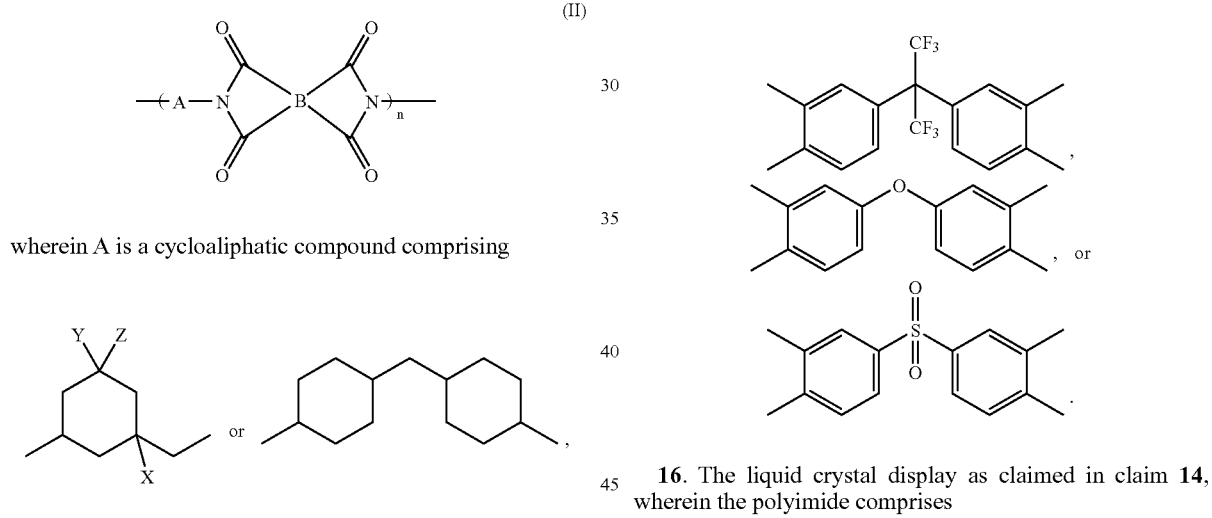

wherein A is a cycloaliphatic compound comprising

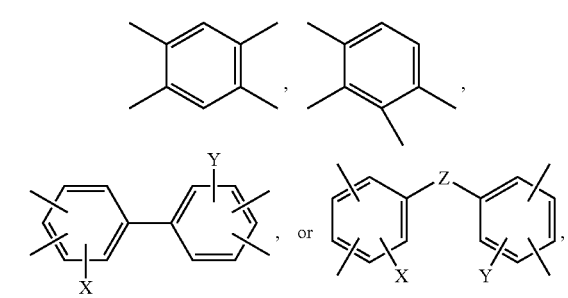

wherein X, Y, and Z comprise hydrogen, methyl, trifluoromethyl, hydroxyl, C1-18 alkyl, bromine, chlorine, or iodine, B is an aromatic compound comprising wherein X and Y comprise hydrogen, methyl, trifluoromethyl, hydroxyl, $C_{1-18}$ alkoxy, bromine, chlorine, or iodine and Z comprises —O—, —SO$_2$—, —CH$_2$—, —C(CH$_3$)$_2$—, —COO(CH$_3$)$_2$COO—, —C(CF$_3$)$_2$—, —Ar—O—Ar—, O—Ar—O—, —Ar—CH$_2$—Ar—, —O—Ar—C(CH$_3$)$_2$—Ar—O—, —O—Ar—Ar—O—, —O—Ar—C(CF$_3$)$_2$—Ar—O—, or —Ar—C(CH$_3$)$_2$—Ar—, wherein Ar is phenyl, and n is 10~10000.

15. The liquid crystal display as claimed in claim 14, wherein B comprises

16. The liquid crystal display as claimed in claim 14, wherein the polyimide comprises

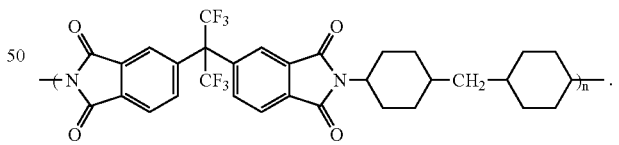

17. The liquid crystal display as claimed in claim 1, further comprising spacers formed between the color filter substrate and the array substrate.

18. The liquid crystal display as claimed in claim 1, further comprising liquid crystals interposed between the color filter substrate and the array substrate.

19. The liquid crystal display as claimed in claim 1, wherein the substrate comprising polyimide has haze less than 4%.

20. The liquid crystal display as claimed in claim 1, wherein the substrate comprising polyimide has a transmission rate exceeding 70%.

21. The liquid crystal display as claimed in claim 1, wherein the substrate comprising polyimide has a yellow index less than 6.5%.

22. The liquid crystal display as claimed in claim 1, wherein the substrate comprising polyimide has a glass transition temperature (Tg) of about 250-350° C.

23. The liquid crystal display as claimed in claim 1, wherein the substrate comprising polyimide has a coefficient of thermal expansion (CTE) of about 20-75 ppm/° C.

24. The liquid crystal display as claimed in claim 1, wherein the substrate comprising polyimide has a pencil hardness exceeding 2H.

25. The liquid crystal display as claimed in claim 1, wherein the substrate comprising polyimide has retardation less than 200 nm.

26. The liquid crystal display as claimed in claim 1, wherein the substrate comprising polyimide has a thickness of about 20-200 μm.

27. The liquid crystal display as claimed in claim 1, wherein the substrate comprising polyimide has a thickness of about 50~150 μm.

28. A liquid crystal display, comprising: a color filter substrate; and an array substrate; wherein at least one of the color filter substrate and the array substrate consists of polyimide and inorganic powder, wherein the inorganic powder has a weight ratio of about 1-20 wt %, and wherein the polyimide comprises

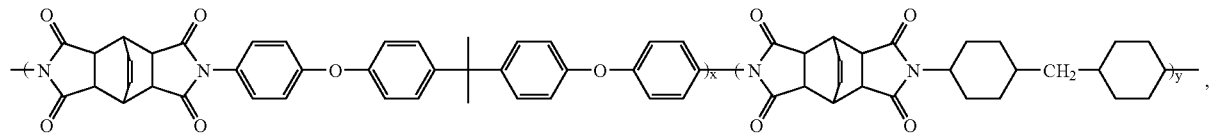

wherein x and y are 10~10,000.

* * * * *